(12) United States Patent
Alanqar et al.

(10) Patent No.: US 10,767,886 B2
(45) Date of Patent: Sep. 8, 2020

(54) BUILDING MANAGEMENT SYSTEM WITH SATURATION DETECTION AND REMOVAL FOR SYSTEM IDENTIFICATION

(71) Applicant: Johnson Controls Technology Company, Auburn Hills, MI (US)

(72) Inventors: Anas W. I. Alanqar, Milwaukee, WI (US); Matthew J. Ellis, Milwaukee, WI (US); Michael J. Wenzel, Grafton, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 6 days.

(21) Appl. No.: 15/900,459

(22) Filed: Feb. 20, 2018

(65) Prior Publication Data
US 2019/0257544 A1 Aug. 22, 2019

(51) Int. Cl.
*F24F 11/63* (2018.01)
*F24F 11/00* (2018.01)
*G05B 13/02* (2006.01)

(52) U.S. Cl.
CPC .......... *F24F 11/63* (2018.01); *F24F 11/0001* (2013.01); *G05B 13/0265* (2013.01)

(58) Field of Classification Search
CPC .... F24F 11/63; F24F 11/0001; G05B 13/0265
See application file for complete search history.

(56) References Cited

U.S. PATENT DOCUMENTS 4,707,324 A * 11/1987 Storrick ............... G21C 7/36
376/215
6,405,554 B1 * 6/2002 Kawakatu ............ F25B 7/00
62/175
(Continued)

FOREIGN PATENT DOCUMENTS

JP 2012141110 A * 7/2012

OTHER PUBLICATIONS

Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.
(Continued)

*Primary Examiner* — Thomas C Lee
*Assistant Examiner* — Michael Tang
(74) *Attorney, Agent, or Firm* — Foley & Lardner LLP

(57) ABSTRACT

A building management system includes building equipment, a sensor, and a saturation detector. The building equipment is configured to operate at an operating capacity to drive a variable state or condition of a building zone toward a setpoint. The operating capacity and the setpoint vary over time. The sensor is in the building zone and is configured to provide a zone measurement of the variable state or condition of the building zone. The saturation detector is configured to determine whether the operating capacity is in a non-transient region for a threshold amount of a time period upon determining that an error for the building zone exists for the time period, and, in response to a determination that the operating capacity is in the non-transient region for at least the threshold amount of the time period, indicate the time period as a saturation period.

20 Claims, 12 Drawing Sheets

(56) References Cited

U.S. PATENT DOCUMENTS

| | | | | |
|---|---|---|---|---|
| 6,468,814 | B1* | 10/2002 | Frees | H01L 21/67253 |
| | | | | 250/282 |
| 8,200,345 | B2 | 6/2012 | Li et al. | |
| 8,694,132 | B2 | 4/2014 | Li et al. | |
| 8,903,554 | B2 | 12/2014 | Stagner | |
| 9,235,657 | B1 | 1/2016 | Wenzel et al. | |
| 2004/0168450 | A1* | 9/2004 | Nishiwaki | F01P 11/16 |
| | | | | 62/178 |
| 2004/0248589 | A1* | 12/2004 | Gwon | G01S 5/0252 |
| | | | | 455/456.1 |
| 2011/0214020 | A1* | 9/2011 | Caspi | G06F 11/0709 |
| | | | | 714/37 |
| 2013/0338935 | A1* | 12/2013 | Watanabe | H01J 49/0036 |
| | | | | 702/23 |
| 2014/0331700 | A1* | 11/2014 | Madsen | F25B 49/005 |
| | | | | 62/115 |
| 2015/0274346 | A1* | 10/2015 | Buckby | B65C 9/1865 |
| | | | | 156/64 |
| 2015/0316907 | A1 | 11/2015 | Elbsat et al. | |
| 2016/0305678 | A1* | 10/2016 | Pavlovski | G05B 13/048 |
| 2018/0285800 | A1 | 10/2018 | Wenzel et al. | |

OTHER PUBLICATIONS

Diederik Kingma and Jimmy Ba. Adam: A Method for Stochastic Optimization. In International Conference on Learning Representations (ICLR), 2015, 15 pages.

George EP Box, Gwilym M Jenkins, Gregory C Reinsel, and Greta M Ljung. Time Series Analysis: Forecasting and Control. John Wiley & Sons, 2015, chapters 13-15. 82 pages.

Jie Chen and Guoxiang Gu. Control-oriented System Identification: an H1 Approach, vol. 19. Wiley-Interscience, 2000, chapters 3 & 8, 38 pages.

Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.

K. J. Astrom. Optimal Control of Markov Decision Processes with Incomplete State Estimation. J. Math. Anal. Appl., 10:174-205, 1965.31 pages.

Kelman and F. Borrelli. Bilinear Model Predictive Control of a HVAC System Using Sequential Quadratic Programming. In Proceedings of the 2011 IFAC World Congress, 2011, 6 pages.

Lennart Ljung and Torsten Soderstrom. Theory and practice of recursive identification, vol. 5. JSTOR, 1983, chapters 2, 3 & 7, 80 pages.

Lennart Ljung, editor. System Identification: Theory for the User (2nd Edition). Prentice Hall, Upper Saddle River, New Jersey, 1999, chapters 5 and 7, 40 pages.

Moritz Hardt, Tengyu Ma, and Benjamin Recht. Gradient Descent Learns Linear Dynamical Systems. arXiv preprint arXiv:1609.05191, 2016, 44 pages.

Nevena et al. Data center cooling using model-predictive control, 10 pages.

Sergio Bittanti, Marco C Campi, et al. Adaptive Control of Linear Time Invariant Systems: The "Bet on the Best" Principle. Communications in Information & Systems, 6(4):299-320, 2006. 21 pages.

Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.

Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.

U.S. Appl. No. 16/240,028, filed Jan. 4, 2019, Johnson Controls Technology Company.

U.S. Appl. No. 16/418,715, filed May 21, 2019, Johnson Controls Technology Company.

Batterman, Stuart. Review and Extension of CO2-Based Methods to Determine Ventilation Rates with Application to School Classrooms. International Journal of Environmental Research and Public Health. Feb. 4, 2017. 22 Pages.

Chen, Xiao; Wang, Qian; Srebric, Jelena. Occupant Feedback Based Model Predictive Control for Thermal Comfort and Energy Optimization: A Chamber Experimental Evaluation. Applied Energy 164. 2016, pp. 341-351.

Kang et al., Novel Modeling and Control Strategies for a HVAC System Including Carbon Dioxide Control. Jun. 2, 2014. 19 Pages.

Lampinen, Markku J. Thermodynamics of Humid Air. Sep. 2015. 39 Pages.

Ljung, L. (1999). System Identification: Theory for the User, 2nd ed. (Prentice Hall PTR, Upper Saddle River).

Luo, Xiaoyan. Maximizing Thermal Comfort and International Design. Loughborough University. Jan. 18, 2019. 4 Pages.

Pannocchia, G. & Rawlings, J.B. (2003) Disturbance Models for Offset-Free Model-Predictive Control. AIChE Journal, 49,426-437.

Sama Aghniaey et al., The Assumption of Equidistance in the Seven-Point Thermal Sensation Scale and a Comparison between Categorical and Continuous Metrics. University of Georgia College of Engineering, Jan. 18, 2019. 4 Pages.

Sudhakaran, Saurabh; Shaurette Mark. Temperature, Relative Humidity, and CarbonDioxide Modulation in a Near-Zero Energy Efficient Retrofit House. Purdue University. 2016, 11 Pages.

Weekly, Kevin et al., Modeling and Estimation of the Humans' Effect on the CO2 Dynamics Inside a Conference Room. IEEE Transactions on Control Systems Technology, vol. 23, No. 5, Sep. 2015, 12 pages.

* cited by examiner

BUILDING MANAGEMENT SYSTEM WITH SATURATION DETECTION AND REMOVAL FOR SYSTEM IDENTIFICATION

BACKGROUND

The present disclosure relates generally to a building management system (BMS). More particularly, the present disclosure relates to a BMS with saturation detection and removal to facilitate the generation of linear models in system identification. System identification is the process of determining a system of equations (e.g., a system model) that allow for the prediction of future system states or system outputs.

As used herein, saturation refers to the usage of a maximum or minimum HVAC capacity to track a desired temperature set-point for buildings under heating and cooling modes. Control saturation drastically influences plant models obtained when using system identification because saturation leads to nonlinear behavior. One way to deal with saturation is nonlinear system identification, which may be able to capture model dynamics under saturation. However, obtaining such models adds a degree of complexity to the system identification optimization problem, often becoming too computationally expensive to use for on-line optimization based control.

Another way to deal with saturation is saturation detection and removal. Removing saturation allows for linear models that can capture the plant dynamics in the linear range. Obtaining linear models is desirable for on-line control because linear models reduce computational complexity compared to nonlinear models. Several conventional methods are available for saturation detection and removal, including residual detection and nonlinear system detection. However, conventional methods of saturation detection assume that nonlinearity only occurs in the inputs or outputs of the system, and therefore cannot handle nonlinearity that occurs in the system's inherent dynamics (i.e., in the states). These conventional methods are therefore not well suited for saturation detection and removal in HVAC systems.

SUMMARY

One implementation of the present disclosure is a building management system. The building management system includes building equipment, a sensor, and a saturation detector. The building equipment is configured to operate at an operating capacity to drive a variable state or condition of a building zone toward a setpoint. The operating capacity and the setpoint vary over time. The sensor is in the building zone and is configured to provide a zone measurement of the variable state or condition of the building zone. The saturation detector is configured to determine whether the operating capacity is in a non-transient region for a threshold amount of a time period upon determining that an error for the building zone exists for the time period, and, in response to a determination that the operating capacity is in the non-transient region for at least the threshold amount of the time period, indicate the time period as a saturation period.

In some embodiments, determining that an error for the building zone exists for the time period includes receiving data that includes the setpoint and the zone measurement for each of a plurality of time steps in the time period, calculating an error term based on the zone measurements and the setpoints for the time period, calculating an error threshold based on the setpoints for the time period and a preceding time period, and determining whether the error term is greater than the error threshold. In some embodiments, the saturation detector is configured to calculate an error term based on the setpoints and the zone measurements for the time period by determining, for each of time step in the time period, an error value based on the difference between the zone measurement for the time step and a deadband around the setpoint and dividing a sum of the error values for the time steps by the number of time steps in the time period. The error value is set to zero if the zone measurement for the time step is within the deadband.

In some embodiments, the setpoint changes from a preceding setpoint to a selected setpoint at the beginning of the time period and from the selected setpoint to a subsequent setpoint at the end of the time period. The saturation detector is configured to calculate the error threshold based on the setpoints for the time period and the preceding time period by calculating a difference between the preceding setpoint and the selected setpoint, modifying the difference to account for deadbands around the setpoint temperatures, dividing the modified difference by a constant, defining a fraction based on a duration of the time period and a minimum theoretical time needed for the building equipment to cause the zone measurement to go from the preceding setpoint to the selected setpoint, and multiplying the difference by the fraction.

In some embodiments, the saturation detector is also configured to define the non-transient region as outside of a transient region. The transient region is defined by determining a region bound by a maximum measured operating capacity and a minimum measured operating capacity and truncating the region by a percentage of the difference between the maximum measured operating capacity measurement and the minimum measured operating capacity measurement.

In some embodiments, the saturation detector is configured to determine whether the operating capacity is in the non-transient region for the threshold amount of the time period by determining, for each time step in the time period, whether the operating capacity for the time step is in the non-transient region, counting a number of time steps for which the operating capacity is in the non-transient region, and checking if the number is more than a threshold portion of a total number of time steps in the time period.

In some embodiments, the building management system also includes a training data generator configured to aggregate setpoints, zone measurements, and operating capacities over a sampling period and remove data corresponding to time periods indicated as saturation periods to generate a set of training data. The building management system also includes a system identification module that receives the set of training data and identifies a system model based on the training data. In some embodiments, the building management system is configured to control the building equipment to drive the current zone measurement setpoint toward the current setpoint.

Another implementation of the present disclosure is a method. The method includes operating building equipment at an operating capacity to drive a variable state or condition of a building zone toward a setpoint. The operating capacity and the setpoint vary over time. The method also includes measuring, by a sensor in the building zone, a zone measurement, receiving, by a building management system, data that includes an operating capacity, a setpoint, and the zone measurement for each of a plurality of time steps in a time period, determining whether the operating capacity is in a non-transient region for a threshold amount of the time period upon determining that an error for the building zone exists for the time period, and in response to a determination that the operating capacity is in the non-transient region for at least the threshold amount of the time period, indicating the time period as a saturation period.

In some embodiments, determining that the error for the building zone exists includes calculating an error term based on the zone measurements and the setpoints for the time period, calculating an error threshold based on the setpoints for the time period and a preceding time period, and determining whether the error term is greater than the error threshold. In some embodiments, calculating an error term based on the zone measurements and the setpoints for the time period includes determining, for each time step in the time period, an error value based on the difference between the zone measurement for the time step and a deadband around the setpoint and dividing a sum of the error values for the time steps by the number of time steps in the time period. The error value is set to zero if the air temperature measurement for the time step is within the deadband.

In some embodiments, the setpoint changes from a preceding setpoint to a selected setpoint at the beginning of the time period and from the selected setpoint temperature to a subsequent setpoint temperature at the end of the time period. Calculating the error threshold based on the setpoints for the time period and the preceding time period includes calculating a difference between the preceding setpoint and the selected setpoint, modifying the difference to account for deadbands around the setpoint, dividing the modified difference by a constant, defining a fraction based on a duration of the time period and a minimum theoretical time needed for the building equipment to cause the zone measurement to go from the preceding setpoint to the selected setpoint, and multiplying the modified difference by the fraction.

In some embodiments, the method also includes defining the non-transient region for operating capacities as outside of a transient region, the transient region defined by determining a region bound by a maximum measured operating capacity and a minimum measured operating capacity and truncating the region by a percentage of the difference between the maximum measured operating capacity measurement and the minimum measured operating capacity measurement. In some embodiments, determining whether the operating capacity is in the non-transient region for the threshold amount of the time period includes determining, for each time step in the time period, whether the operating capacity for the time step is in the non-transient region, counting a number of time steps for which the operating capacity is in the non-transient region, and checking if the number is more than a threshold portion of a total number of time steps in the time period.

In some embodiments, the method includes generating a set of training data by aggregating zone measurements, operating capacities, and setpoints over a sampling period that includes the time period and removing zone measurements, operating capacities, and setpoints that correspond to the saturation period. A system model is identified based on the set of training data.

Another implementation of the present disclosure is a method for saturation detection in an HVAC system. The method includes operating HVAC equipment at a measurable operating capacity to heat or cool a building zone to approach a setpoint temperature, measuring air temperature in the building zone, changing the setpoint temperature a plurality of times over a time span and aggregating data that includes an operating capacity, a setpoint temperature, an air temperature for each of a plurality of time steps in the time span, and defining a transient region of operating capacities corresponding to a non-saturated status and a non-transient region as outside of the transient region. For each of a plurality of time periods bound by sequential changes in setpoint temperatures, the method further includes calculating an error term for the time period based on the air temperatures and the setpoint temperature for the time period, calculating an error threshold based on the setpoint temperature for the time period and a preceding setpoint temperature, and determining whether the error term is greater than the error threshold. In response to a determination that the error term is greater than the error threshold, the method includes determining whether the operating capacity is in the non-transient region for a threshold amount of the time period. In response to a determination that the operating capacity is in the non-transient region for the threshold amount of the time period, the method includes indicating the time period as a saturation period.

In some embodiments, defining a transient region of operating capacities corresponding to a non-saturated status includes determining a maximum operating capacity in the time span, determining a minimum operating capacity in the time span, calculating a difference between the maximum operating capacity and the minimum operating capacity, and defining the transient region as ranging between the maximum operating capacity reduced by a percentage of the difference and the minimum operating capacity increased by the percentage of the difference.

In some embodiments, calculating an error term for the time period based on the air temperatures and the setpoint temperature for the time period includes determining, for each time step in the time period, an error value based on the difference between the air temperature measurement for the time step and a deadband around the setpoint temperature and dividing a sum of the error values for the time steps by the number of time steps in the time period. The error value is set to zero if the air temperature measurement for the time step is within the deadband.

In some embodiments, calculating an error threshold based on the setpoint temperature for the time period and the preceding setpoint temperature comprises calculating a difference between the preceding setpoint temperature and the setpoint temperature, modifying the difference to account for deadbands around the preceding setpoint temperature and the setpoint temperature, and dividing the modified difference by a constant.

In some embodiments, calculating an error threshold based on the setpoint temperature for the time period and the preceding setpoint temperature includes defining a fraction based on a duration of the time period and a minimum theoretical time needed for the HVAC equipment to cause the air temperature measurement to go from the preceding temperature setpoint to the selected temperature setpoint and multiplying the modified difference by the fraction. In some embodiments, determining whether the operating capacity is in the non-transient region for a threshold amount of the time period includes determining, for each time step in the time period, whether the operating capacity for the time step is in the non-transient region, counting a number of time steps for which the operating capacity is in the non-transient region, and checking if the number is more than a threshold portion of a total number of time steps in the time period.

DETAILED DESCRIPTION

Building HVAC Systems and Building Management Systems

Figure 1:
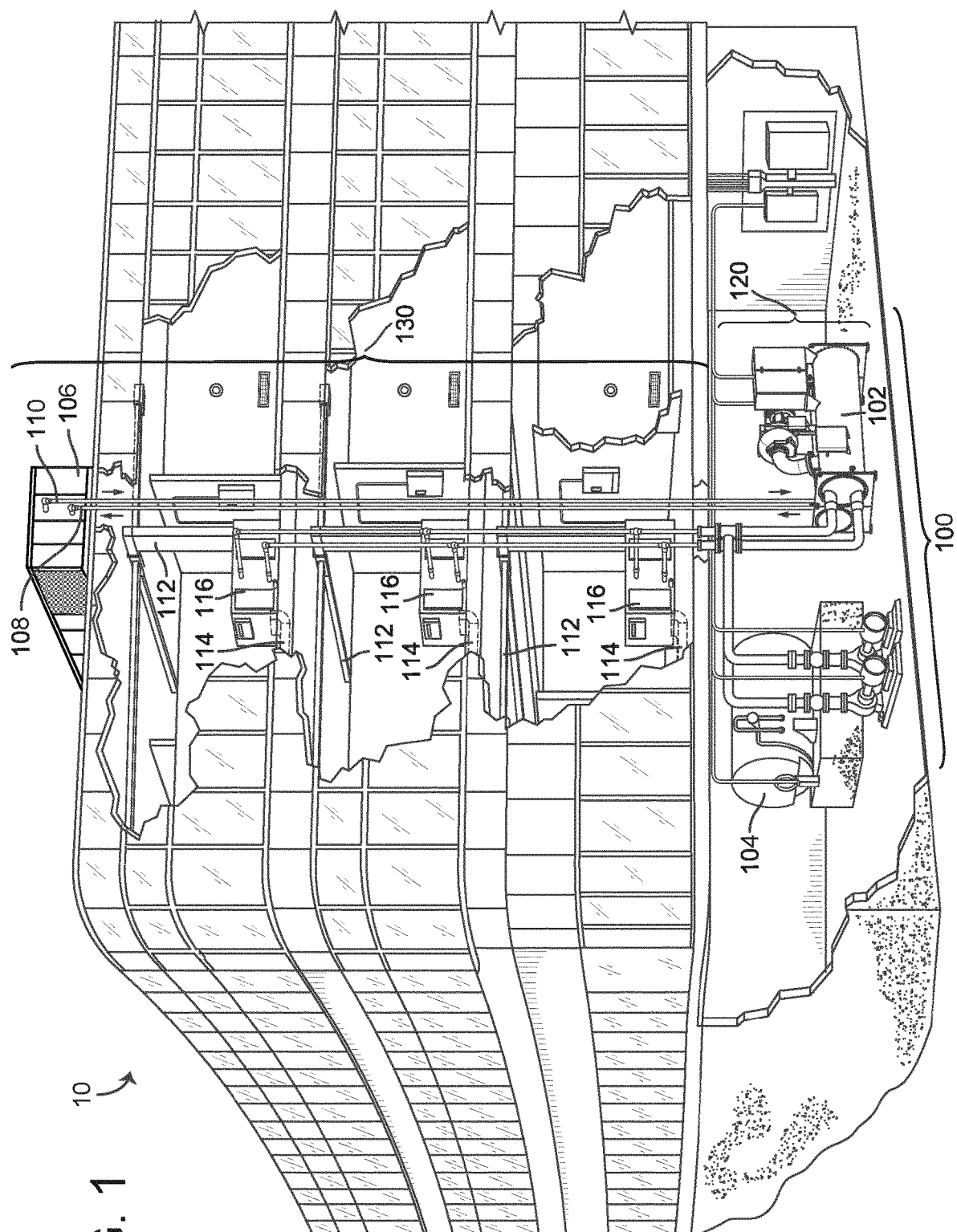
FIG. 1 is a drawing of a building equipped with a HVAC system, according to some embodiments.
Figure 2:
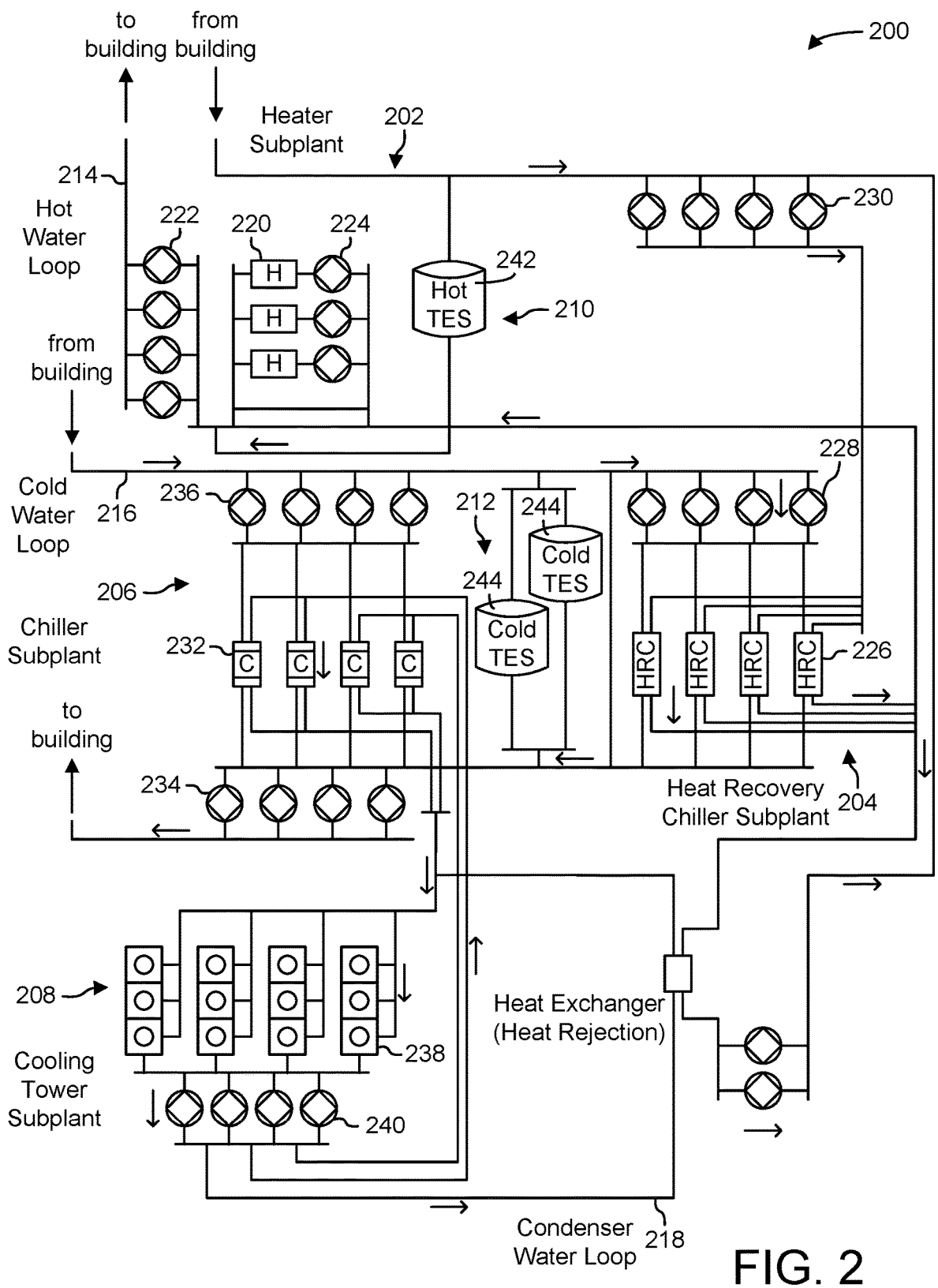
FIG. 2 is a block diagram of a waterside system which can be used to serve the building of FIG. 1, according to some embodiments.
Figure 3:
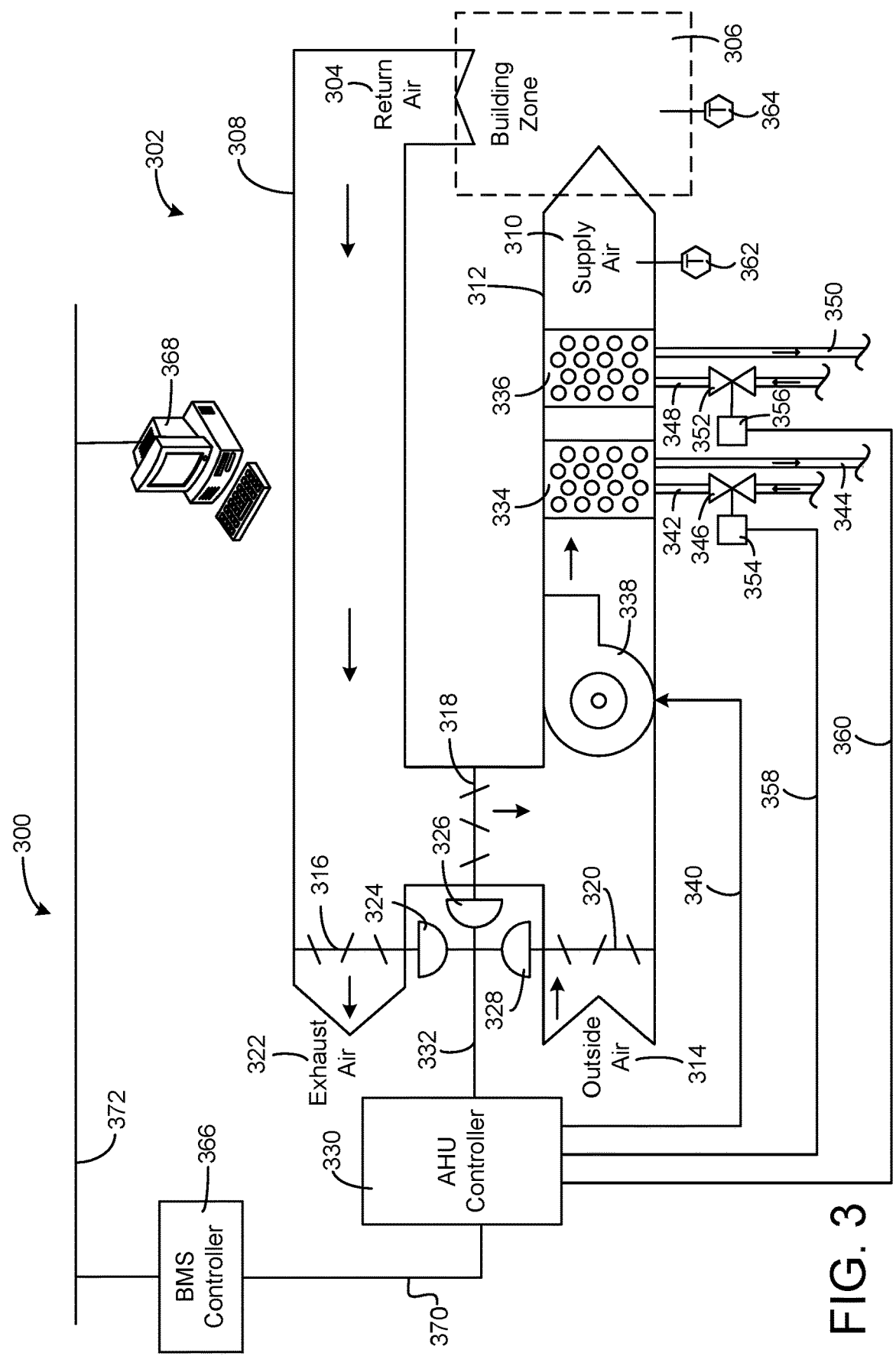
FIG. 3 is a block diagram of an airside system which can be used to serve the building of FIG. 1, according to some embodiments.
Figure 4:
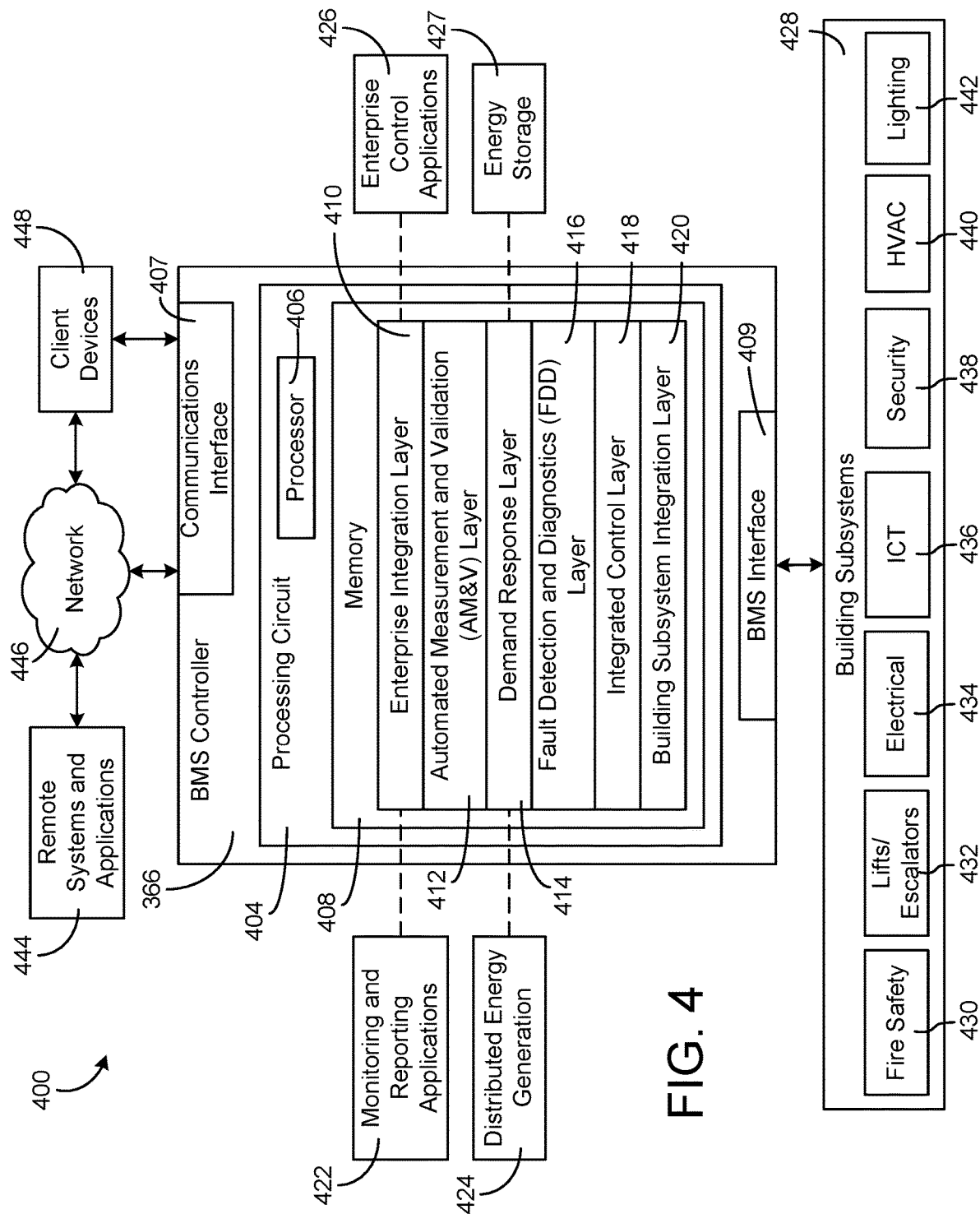
FIG. 4 is a block diagram of a building management system (BMS) which can be used to monitor and control the building of FIG. 1, according to some embodiments.
Figure 5:
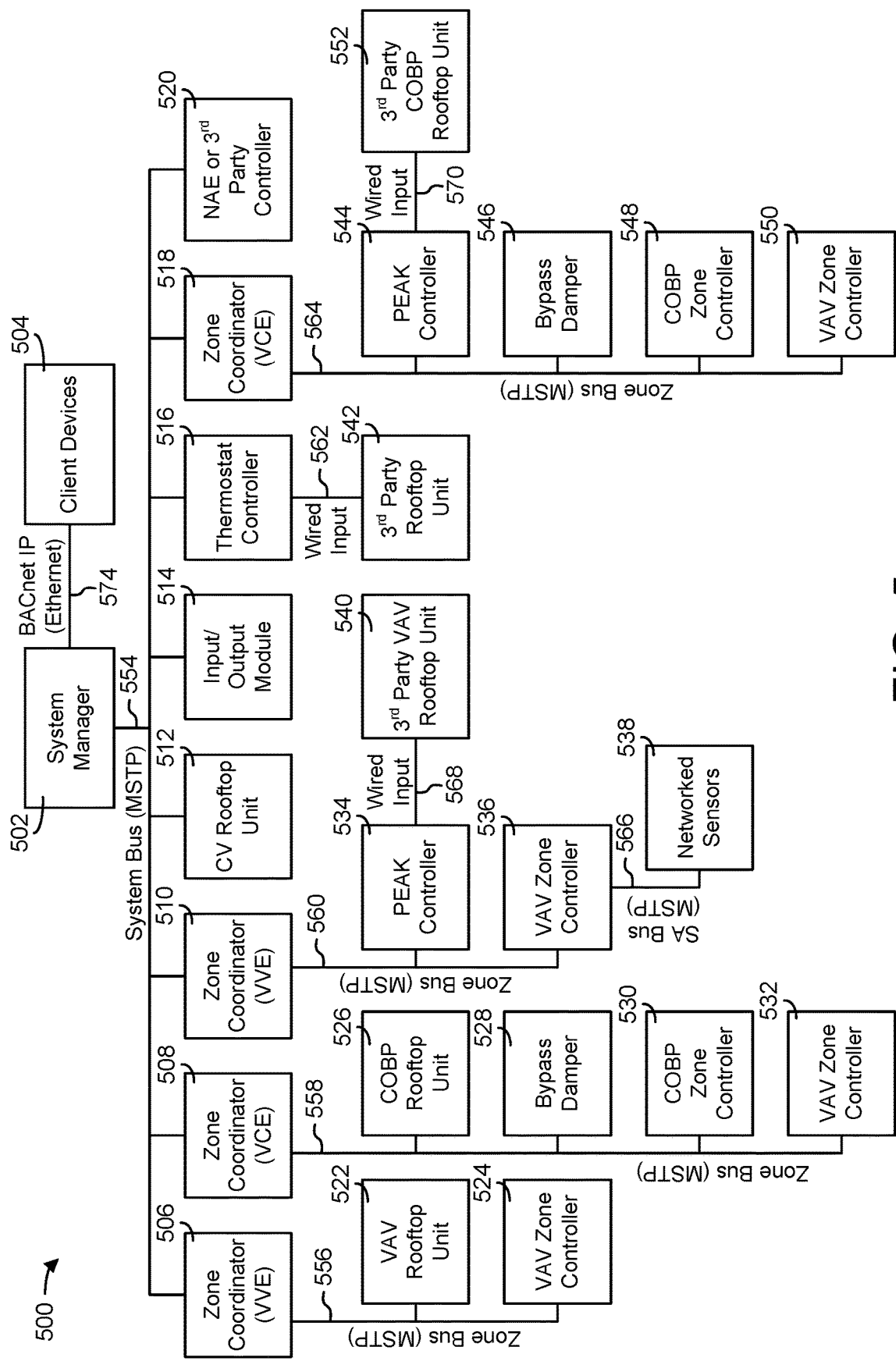
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments, BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration layer 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response layer 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Saturation Detection and Removal

Referring generally to FIGS. 6-11, systems and methods for saturation detection and removal are shown, according to some embodiments. The systems and methods of FIGS. 6-11 can implemented using or as part of a building management system or HVAC system, for example waterside system 200 of FIG. 2, air handling unit 300 of FIG. 3, BMS 400 of FIG. 4, and/or BMS 500 of FIG. 5. For ease and clarity of explanation, the following description of FIGS. 6-11 makes reference to elements of air handling unit 300. However, it should be noted that various embodiments of the present disclosure may be implemented with or on a variety of HVAC systems, BMS, and combinations thereof.

Figure 6:
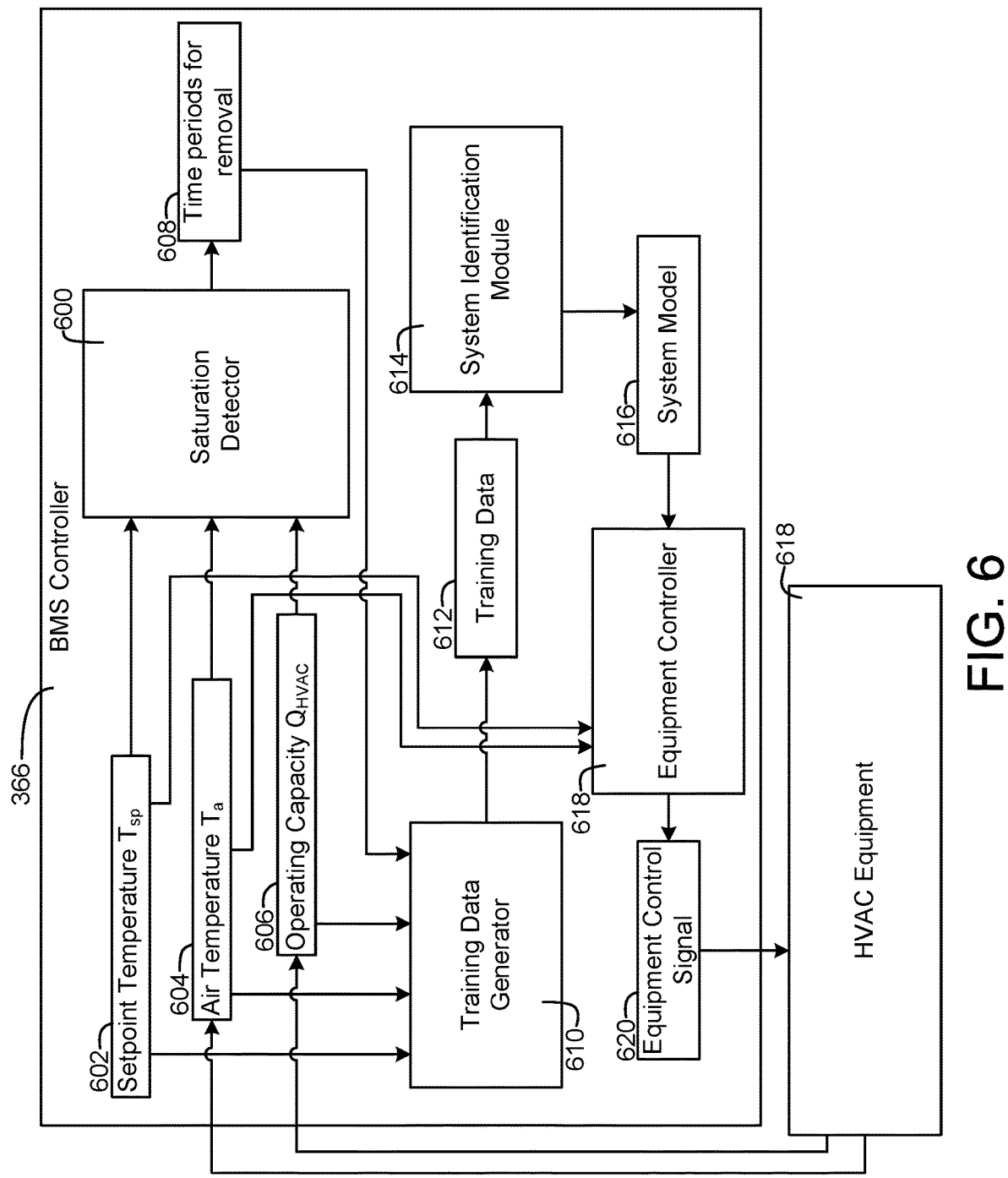
FIG. 6 is an input/output block diagram of a saturation detector implemented with the airside system of FIG. 3, according to some embodiments.

Referring now to FIG. 6, an input/output block diagram of a saturation detector 600, a training data generator 610, a system identification module 614, and an equipment controller 618 implemented within BMS controller 366 of FIG. 3 is shown, according to an exemplary embodiment. As noted above, in alternative embodiments the saturation detection and system identification process may be implemented on other BMS or HVAC components or systems.

As shown in FIG. 6, the saturation detector 600 receives data for three points, namely the setpoint temperature 602, the air temperature 604, and the operating capacity 606 and returns timestamp ranges for which data should be removed before use for system identification. Each point provides data that includes a data point and a timestamp, such that the data received by the BMS controller 366 is a time series of data for each point. The time series align across points, such that the simultaneous setpoint temperature, the zone air temperature, and power can be known for a given moment in time.

The setpoint temperature ("Tsp") 602 is the desired temperature of the building or building zone served by an HVAC system, for example building zone 306 served by air handling unit 300. The setpoint temperature may be input by a user (e.g., via client device 368) or generated by the BMS controller 366. In the embodiments described herein, the setpoint temperature changes in value in discrete steps at particular moments in time (e.g., at 7:02:12 a.m., the setpoint temperature jumps from 65 degrees F. to 70 degrees F.). As used herein, $Tsp_i$ denotes the ith setpoint temperature, $Tsp_{i-1}$ denotes the immediately preceding setpoint temperature, $Tsp_{i+1}$ denotes the immediately subsequent setpoint temperature, $S_i$ denotes the time of the change in setpoint from $Tsp_{i-1}$ to $Tsp_i$, and $L_i$ denotes the amount of time at $Tsp_i$.

The air temperature 604 ("Ta") is the measured temperature of the air in the building or building zone served by the HVAC system, for example building zone 306 served by air handling unit 300. For example, the air temperature 604 of building zone 306 is measured by temperature sensor 364 and communicated from the temperature sensor 364 to the BMS controller 336. In general, a primary goal of an HVAC system is to heat/cool the air in a building zone to drive the air temperature 604 towards the setpoint temperature 602 and/or to maintain the air temperature 604 at or near the setpoint temperature 602. In addition to being influenced by heating/cooling from the HVAC system, the air temperature 604 may also be dependent on outside air temperature and sources of energy in the building such as heat from electronics, people, etc. inside the building. As used herein, $Ta_i$ denotes an air temperature 604 measured while the temperature setpoint 604 is at $Tsp_i$, while $Ta_i(k)$ denotes the air temperature 604 measured at time k, k between $S_i$ and $S_i+L_i$.

The operating capacity ($Q_{HVAC}$) 606 is the rate of heat transfer into or out of the building or building zone served by the HVAC system, for example building zone 306 served by air handling unit 300 (e.g., measured in watts or kilowatts). For example, when the air handling unit 300 is in a heating mode, $Q_{HVAC}$ is the rate of heat transfer from heating coils 336 to the supply air 310. When the air handling unit 300 is in a cooling mode, $Q_{HVAC}$ is the rate of heat transferred from the supply air 310 to the cooling coils 334. $Q_{HVAC}$ can be measured or derived from measurements or known values in the air handling unit 300, for example by measuring the temperature of the supply air 310 with temperature sensor 362 and measuring or otherwise finding the volume of supply air per unit time provided by the fan 338. HVAC systems such as air handling unit 310 have upper and lower $Q_{HVAC}$ saturation limits, which may be time varying (see FIG. 12, described in detail below).

The saturation detector 600 is configured to receive time series data for the setpoint temperature 602, the air temperature 604, and the operating capacity 606 and process the time series data to identify time periods 608 with saturation. The saturation detector conducts this data processing as shown in FIGS. 7-12 and described with reference thereto. The saturation detector may be a saturation detection circuit. The output of the saturation detector 600 is a list of time periods (e.g., $S_i$ to $S_i+L_i$) for which saturation was detected.

The training data generator 610 receives the setpoint temperature 602, the air temperature 604, the operating capacity 606, and the time periods 608 with saturation. The training data generator 610 is configured to aggregate the setpoint temperature 602, the air temperature 604, and the operating capacity 606 in a data set and remove data that corresponds to the time periods 608 flagged for removal. That is, the training data generator 610 removes setpoint temperatures 602, air temperatures 605, and operating capacities 606 with time stamps that fall within one of the identified time periods 608. The training data generator 610 thereby generates a discontinuous set of training data 612.

The training data 612 is received by the system identification module 614. The system identification module is configured to perform a system identification process to generate a model of the system. Possible system identification processes are described in U.S. Pat. No. 9,235,657, incorporated by reference herein in its entirety. In general, system identification is a process of identifying unspecified system parameters in a model of the building system, for example by minimizing prediction errors. The system identification module 614 is configured to complete a system identification process that considers the discontinuities created in the training data 612 as a result of saturation detection to output a system model 616.

For example, a system identification process may include receiving the training data 612 and a framework model of a building system, and filtering the training data 612 to remove extraneous disturbances (e.g., external weather conditions, heat generated by people in the building, heat generated by electrical resistance within the building). A first error cost function is defined based on the difference between filtered output data of the training data 612 (e.g., air temperatures 604) and model-predicted filtered outputs. An optimization procedure is then carried out to determine system parameters which minimize the first error cost function. The system identification process may further include a second error cost function based on the difference between non-filtered output training data and a model-predicted non-filtered output. A second optimization procedure determines Kalman gain parameters which minimize the second error cost function within a range of non-filtered training data 612.

The equipment controller 618 receives the system model 616 from the system identification module 614, as well as new (i.e., current) values of the setpoint temperature 602 and the air temperature 604. The equipment controller 618 is configured to use the system model to translate the input setpoint temperature 602 and air temperature 604 into an equipment control signal 620. In general, the equipment control signal 620 controls HVAC components (e.g., valves, fans, chillers, boilers) to adjust the operating capacity 606 to drive the air temperature 604 to the setpoint temperature 602.

The equipment control signal 620 is received by HVAC equipment 622. HVAC equipment 622 may include any of the devices described with reference to FIGS. 1-5, including air handling units, chillers, boilers, variable air volume units, etc., as well as various sensors configured to measure the current state of the system (e.g., air temperature 604). HVAC equipment 622 is configured to operate as instructed by equipment control signal 620, for example to drive the air temperature 604 to the setpoint temperature 602, as well as measure the current state of the system to provide a feedback signal to the BMS controller 366 that includes air temperature 604 and operating capacity 606.

Figure 7:
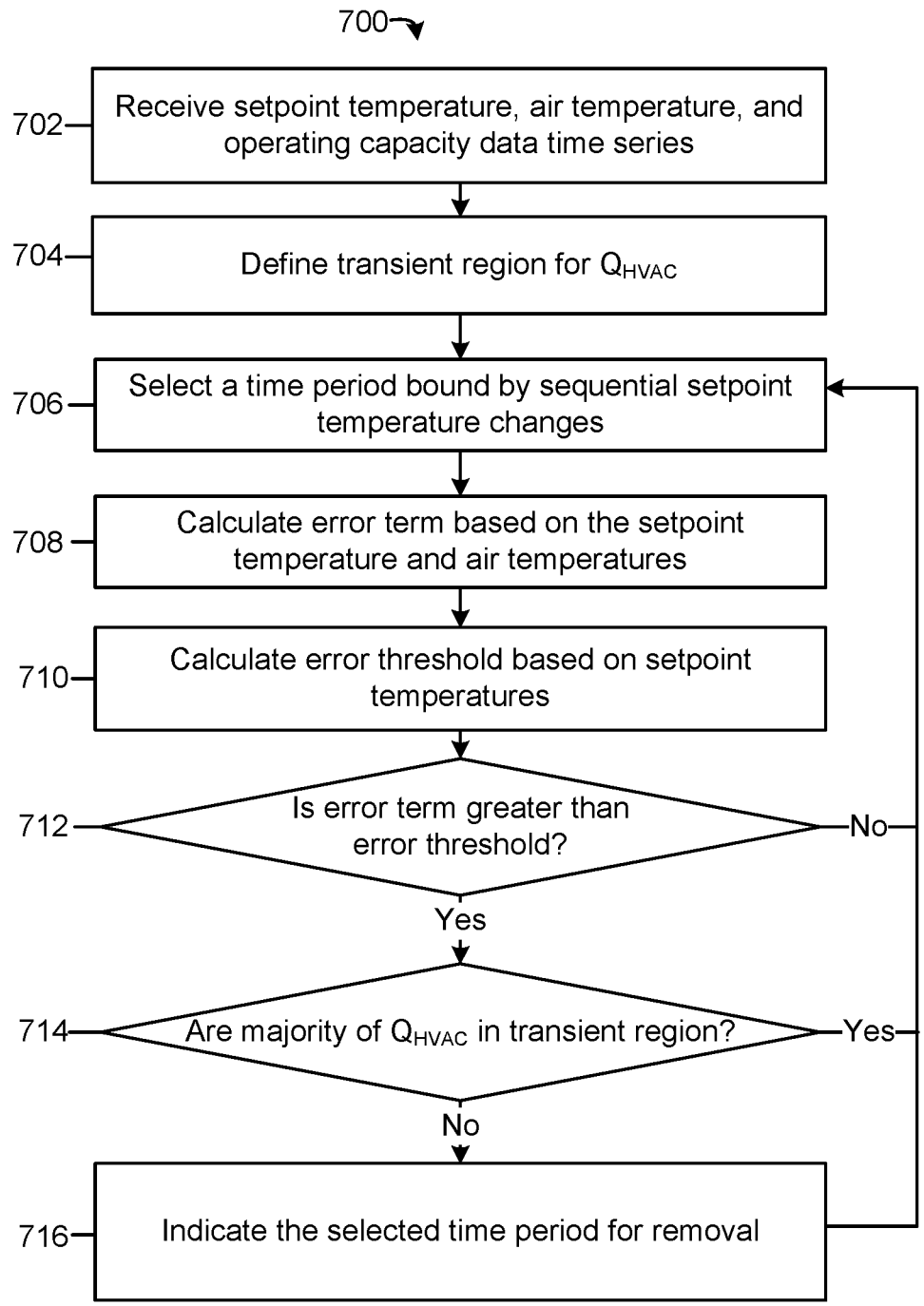
FIG. 7 is a flowchart of a process for saturation detection using the saturation detector of FIG. 6, according to some embodiments.

Referring now to FIG. 7, a flowchart of a process 700 for saturation detection is shown, according to an exemplary embodiment. Process 700 can be carried out by the saturation detector 600 of FIG. 6, and reference is made thereto in the following description for the sake of clarity. In various embodiments, process 700 can also be carried out by BMS 400, BMS 500, various components of air handling unit 300 and waterside system 200, and other BMS components or HVAC systems.

At step 702, the saturation detector 600 of FIG. 6 receives setpoint temperature (Tsp), air temperature (Ta), and operating capacity ($Q_{HVAC}$) data time series. As discussed with reference to FIG. 6, each data point is associated with a time stamp such that the time corresponding to each particular Tsp, Ta, and $Q_{HVAC}$ is included in the data time series received by the saturation detector 600.

At step 704, a transient region for $Q_{HVAC}$ is defined. The transient region corresponds to $Q_{HVAC}$ values between the $Q_{HVAC}$ saturation limits (i.e., values for which $Q_{HVAC}$ is not saturated). The transient region may be determined based on the $Q_{HVAC}$ data received by the saturation detector 600, for example based on locating maximum and minimum $Q_{HVAC}$ values in the data. For example, as described in detail in reference to FIG. 8, the transient region may be defined as the region between the maximum and minimum $Q_{HVAC}$ values truncated from both directions by a percentage of the difference between the maximum and minimum $Q_{HVAC}$ values. A non-transient region may be defined as the regions outside of the transient region.

At step 706, a time period bound by sequential setpoint changes is selected. The temperature setpoint data time series is processed to identify a time period i for which the temperature setpoint $Tsp_i$ differs from both the temperature setpoint for the previous time period $Tsp_{i-1}$ and the temperature setpoint for the next time period $Tsp_{i+1}$ (i.e., $Tsp_i \neq Tsp_{i-1}$ and $Tsp_i \neq Tsp_{i+1}$). In other words, step 706 may include determining a time period for which the temperature setpoint is at a particular setpoint $Tsp_i$ and remains unchanged over the duration of the time period, i.e., a period bound by a change from $Tsp_{i-1}$ to $Tsp_i$ and a change from $Tsp_i$ to $Tsp_{i+1}$. $Tsp_i$ has a different value than $Tsp_{i-1}$ and $Tsp_{i+1}$, while $Tsp_{i-1}$ and $Tsp_{i+1}$ may have different or equivalent values. In some cases, $Tsp_i$ has an equivalent value to one or more other temperature setpoints in the data time series (e.g., $Tsp_{i+2}$). Steps 708-716 are carried out for the selected time period, before returning to step 706 to select another time period corresponding to a temperature setpoint (e.g., $Tsp_{i+1}$ bound by $Tsp_i$ and $Tsp_{i+2}$). Each time period includes one or more discrete time steps k running from the beginning to the end of the selected time period. Each time step k corresponds to a discrete data sample.

At step 708, an error term is calculated for the selected time period based on setpoint temperatures and air temperatures. The error term is generally a metric that quantifies an deviation between the setpoint temperature (i.e., $Tsp_i$) and air temperature measurements (i.e., $Ta_i$) from the selected time period. For example, as described in detail with reference to FIG. 8, the error term may be the average difference between $Tsp_i$ and $Ta_i$ for the selected time period. In some embodiments, the error term takes into consideration a deadband region around the temperature setpoint, such that air temperatures within the deadband are considered to have zero difference from the temperature setpoint for purposes of calculating the error term.

At step 710, an error threshold is calculated based on the setpoint temperature for the selected time period and for the immediately preceding time period (i.e., $Tsp_i$ and $Tsp_{i-1}$). For example, as described in detail with reference to FIG. 8, the error threshold is based on an upper bound on the error term that can be expected for operation of an HVAC system without significant saturation. The threshold may therefore be defined based on the difference between $Tsp_i$ and $Tsp_{i-1}$ and corrected by constants and other terms or logic that take into account deadband regions and the length of the selected time period.

At step 712, the saturation detector 600 checks whether the error term is greater than the error threshold. If the error term is not greater than the error threshold, step 712 may include determining that there is no significant saturation in the selected time period, and the process 700 returns to step 706 to select another time period. However, if the error term is greater than the error threshold, step 712 may include determining that there is significant saturation in the selected time period and the process 700 proceeds to step 714.

If the error term is greater than the error threshold, at step 714 the saturation detector 600 checks whether a threshold amount of the $Q_{HVAC}$ values for the selected time period are within the transient region. In some embodiments, the threshold amount is a majority of the $Q_{HVAC}$ values. However, it is contemplated that any other threshold amount can be selected (e.g., 20% of the $Q_{HVAC}$ values, 30% of the $Q_{HVAC}$ values, 70% of the $Q_{HVAC}$ values, etc.). For example, the operating capacity data may include a $Q_{HVAC}(k)$ for each discrete time step k, k running from the beginning to the end of the selected time period. In such a case, the saturation detector 600 counts how many $Q_{HVAC}(k)$ are in the transient region and asks if that number is more than the threshold amount (e.g., half) of the total number of steps k in the selected time period. If the number of values of $Q_{HVAC}(k)$ that are in the transient region is greater than or equal to the threshold amount, a determination is made that no data for the selected time period should be removed and the process 700 returns to step 706 to selected another time period.

If the number of values of $Q_{HVAC}(k)$ that are in the transient region is less than the threshold amount (i.e., the number of values of $Q_{HVAC}(k)$ that are in a non-transient region is greater than the threshold amount), a determination is made that the selected time period contains saturation and the selected time period is indicated for removal at step 716. The process 700 then returns to step 706 to select another time period. Steps 706-716 (in some cases cut off at step 712 or 714) are repeated for all time periods (i.e., for all setpoint temperature changes). Process 700 thus results in a list or other indication of all time periods in the data series received by the saturation detector 600 that are determined to include significant saturation and for which data is to be removed before further system identification steps are carried out.

Figure 8:
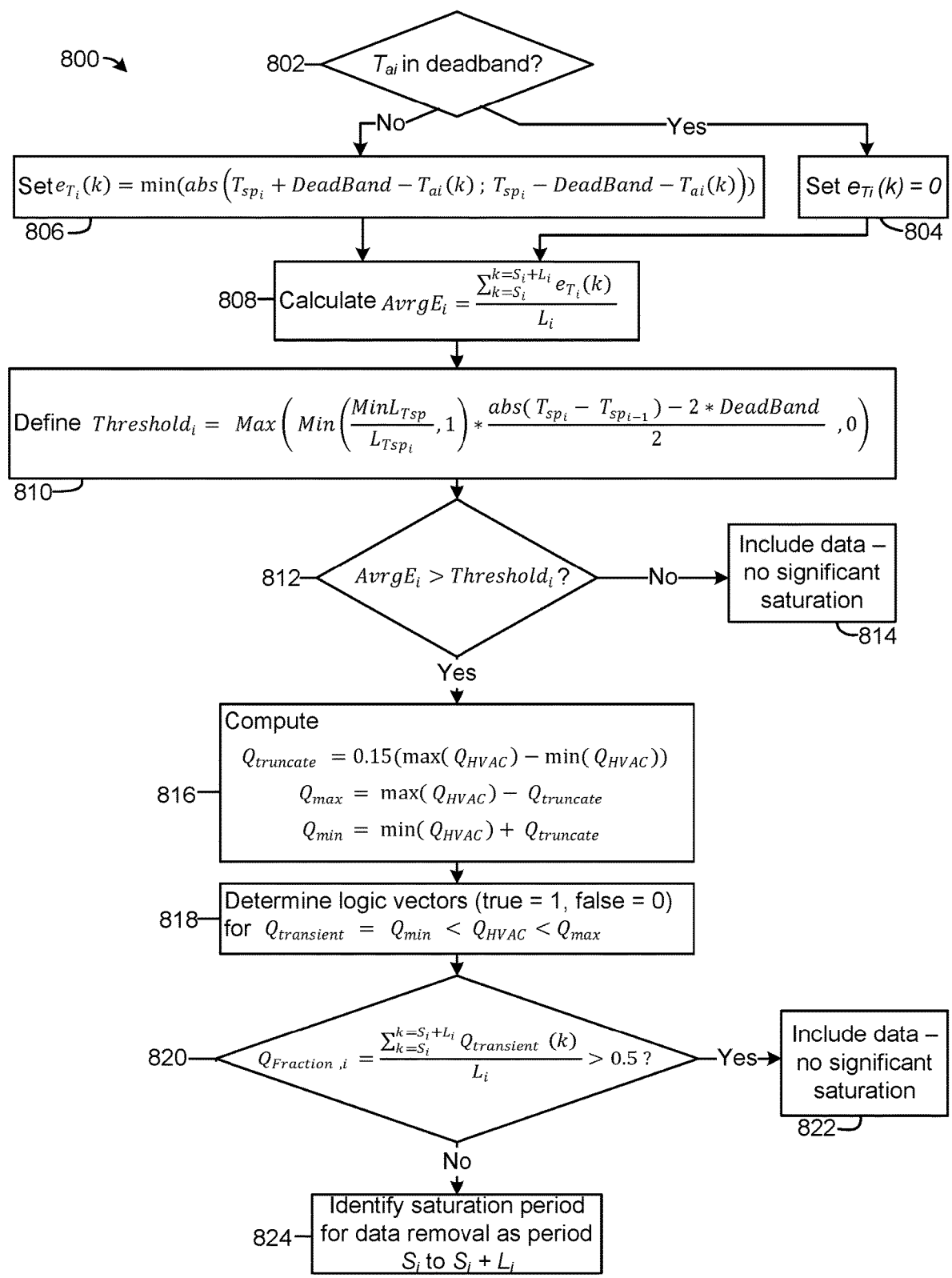
FIG. 8 is a flowchart of a process for saturation detection using the saturation detector of FIG. 6, according to some embodiments.

Referring generally to FIGS. 8-12, a process 800 for saturation detection and visualizations that aid in explanation of the process 800 are shown, according to some embodiments. FIG. 8 shows a flowchart of process 800. FIGS. 9-12 show visualizations of data points and features useful for explanation of the steps of FIG. 8. Reference to FIGS. 9-12 is therefore made throughout the explanation of FIG. 8.

Referring now to FIG. 8, a flowchart of a process 800 is shown, according to some embodiments. Process 800 can be carried out by the saturation detector 600 of FIG. 6, and reference is made thereto in the following description for the sake of clarity. In various embodiments, process 800 is carried out by BMS 400, BMS 500, various components of air handling unit 300 and waterside system 200, and other BMS components or HVAC systems.

Process 800 is an example embodiment of process 700 shown in FIG. 7. As such, process 800 takes as inputs setpoint temperature, air temperature, and operating capacity data for a selected time period defined by setpoint temperature changes. More specifically, the data includes air temperature measurements $Ta_i(k)$ and operating capacity values $Q_{HVAC}(k)$ for each time step k in the time period from $k=S_i$ to $k=S_i+L_i$, where the setpoint temperature changed from $Tsp_{i-1}$ to $Tsp_i$ at $S_i$ and from $Tsp_i$ to $Tsp_{i+1}$ at $S_i+L_i$.

At step 802, for each k, the saturation detector 600 asks if $Ta_i(k)$ is within a deadband around $Tsp_i$. The deadband is defined by the value $Tsp_i$ plus or minus a deadband value ("DeadBand"), such that the deadband has a size of twice the deadband value and is centered on $Tsp_i$. The value of DeadBand may be stored by the saturation detector 600 or may be received as an input to the saturation detector 600. Any temperature within the deadband is considered to be tracking (i.e., considered to be acceptably close to the setpoint temperature).

Figure 9:
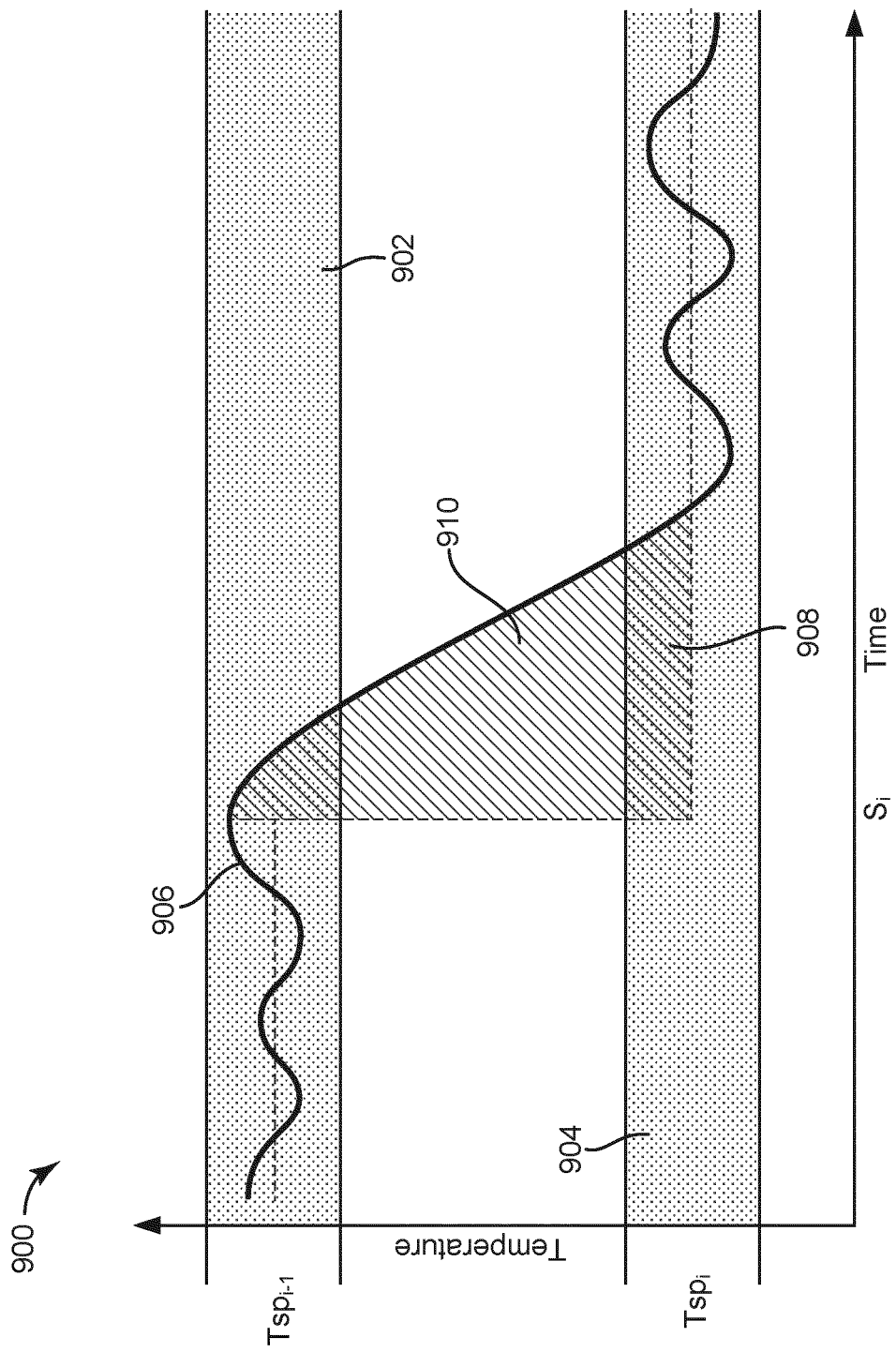
FIG. 9 is a graph of setpoint temperatures and air temperatures that illustrates concepts used in the process of FIG. 8, according to some embodiments.

For example, FIG. 9 shows an graph 900 of a change in temperature setpoint from $Tsp_{i-1}$ to $Tsp_i$. A $Tsp_{i-1}$ deadband 902 is shown around $Tsp_{i-1}$ and a $Tsp_i$ deadband 904 is shown around $Tsp_i$. The graph 900 also shows an air temperature line 906 that indicates air temperature measurements over time and a setpoint line 908 that indicates setpoint temperatures over time. Before the change in temperature setpoint at time $S_i$, the air temperature line 906 is within the $Tsp_{i-1}$ deadband 902, although oscillating around the precise temperature setpoint. In the example of FIG. 9, the air temperature line 906 also enters and stays within the $Tsp_i$ deadband 904, although oscillating up-and-down past $Tsp_i$. Any air temperature values (i.e., indicated by the air temperature line 906) within the deadbands 902, 904 are considered to be tracking the corresponding setpoint.

If $Ta_i(k)$ is within the deadband (i.e., if $Tsp_i$−DeadBand$<Ta_i(k)<Tsp_i$+DeadBand), then at step 804 an error value corresponding to $Ta_i(k)$, denoted as $e_{Ti}(k)$, is set equal to zero. This corresponds to the idea that air temperatures within the deadband are tracking the setpoint temperature.

If $Ta_i(k)$ is not within the deadband (i.e., if $Ta_i(k)<Tsp_i$−DeadBand or $Ta_i(k)>Tsp_i$+DeadBand), then at step 806 an error value $e_{Ti}(k)$ corresponding to $Ta_i(k)$ is calculated as the difference between the temperature and the nearest bound of the deadband. This can be denoted as $e_{Ti}(k)=\min(abs(Tsp_i+DeadBand-Ta_i(k)); Tsp_i-DeadBand-Ta_i(k)))$. As illustrated in FIG. 9, the setpoint change is a decrease and these error values correspond to the area 910 between the air temperature line 906 and the top of the $Tsp_i$ deadband 904 after the change in temperature setpoint. However, if the setpoint change were an increase rather than a decrease, the error values would correspond to the area between the air temperature line 906 and the bottom of the deadband around the new setpoint.

Figure 10A:
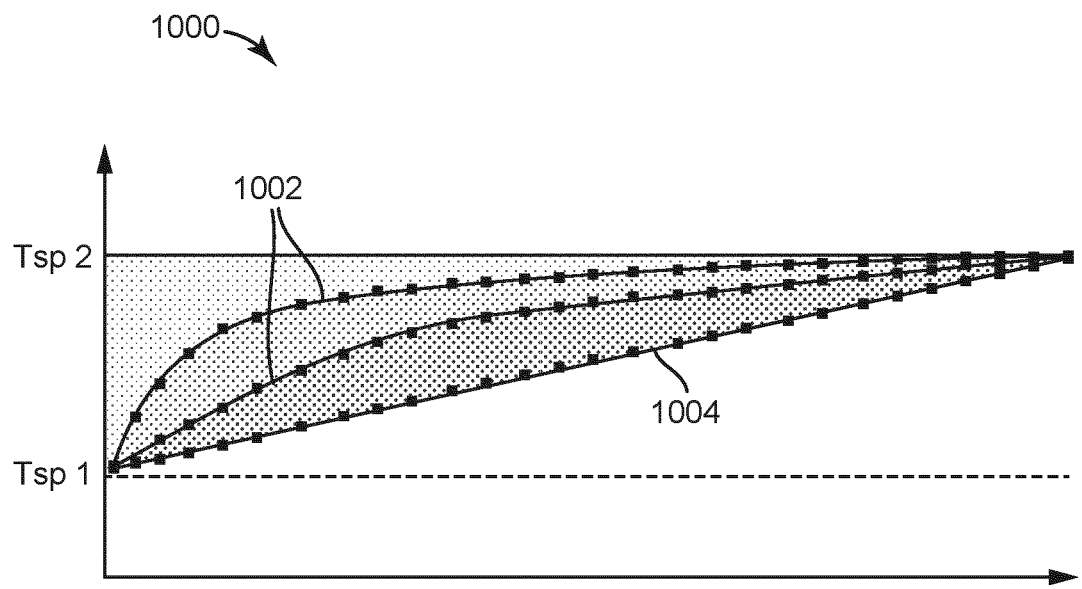
FIGS. 10A-C are graphs of setpoint temperatures and air temperatures that illustrate concepts used in the process of FIG. 8, according to some embodiments.
Figure 10B:
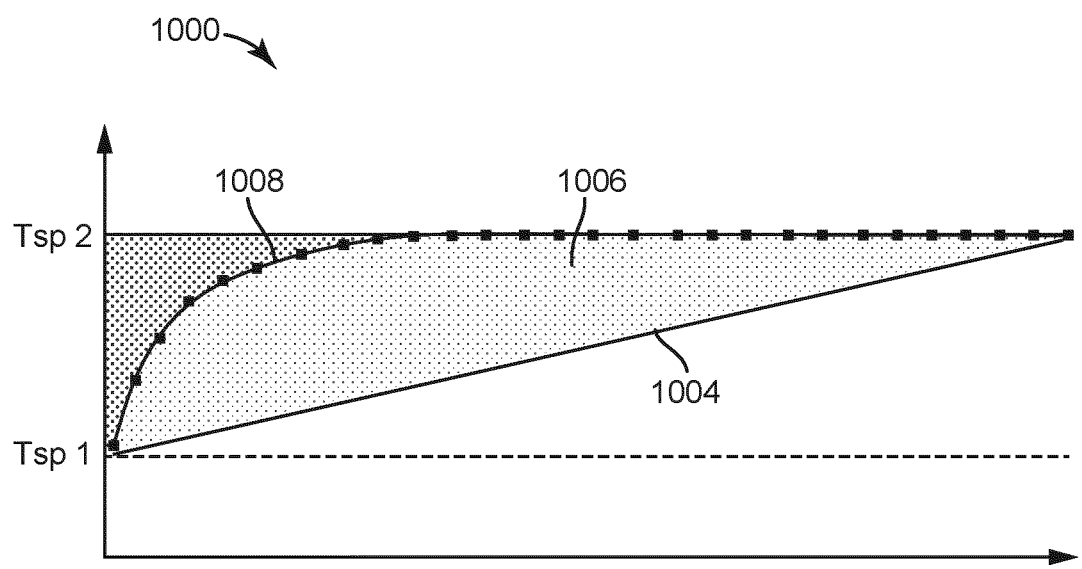
Figure 10C:
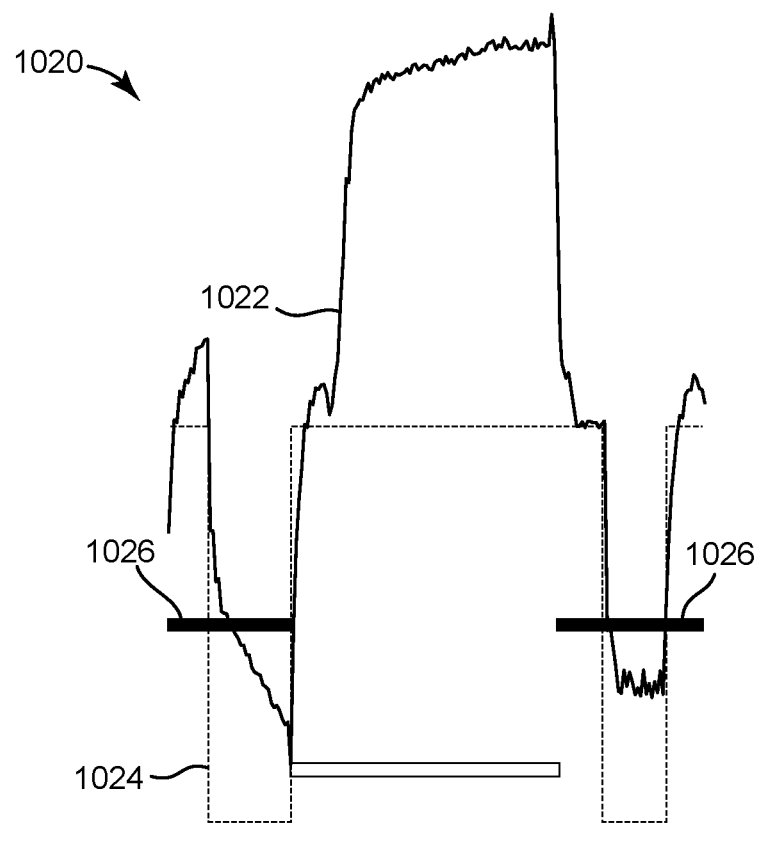

At step 808, an average absolute error term ("$AvrgE_i$") is calculated. $AvrgE_i$ is the sum of error values $e_{Ti}(k)$ for all k in the selected time period (i.e., for all k from $k=S_i$ to $k=S_i+L_i$) divided by $L_i$ (i.e., divided by the length of the time period). At step 810, an error threshold ("$Threshold_i$") is defined as $\max(\min(\min L_{Tsp}/L_i, 1)*(\frac{1}{2})*(abs(Tsp_i-Tsp_{i-1})-DeadBand), 0)$. FIGS. 10A-C can help to illustrate the purpose of the terms in this error threshold definition.

FIG. 10A shows a graph 1000 of a linear system under ideal conditions that begins by operating at exactly a first temperature setpoint $Tsp_1$ (i.e., the air temperature $Ta=Tsp_1$). When this system is subjected to a setpoint temperature change from $Tsp_1$ to $Tsp_2$, the system under ideal conditions will go exponentially towards the desired $Tsp_2$. The time of going to $Tsp_2$ depends on constants within the system and the controller, generally resulting in trajectories 1002 on FIG. 10A. In the idealized conditions, the trajectories 1002 never cross the straight line 1004. Therefore, the average absolute error for the entire period will never be greater than $(\frac{1}{2})*(abs(Tsp_1-Tsp_2))$. The error threshold definition therefore includes the term $(\frac{1}{2})*(abs(Tsp_i-Tsp_{i-1})$. In some embodiments, the error threshold is defined as $(\frac{1}{2})*(abs(Tsp_i-Tsp_{i-1})$ without the other factors.

FIG. 10B shows a graph 1010 illustrating that a basic threshold $(\frac{1}{2})*(abs(Tsp_1-Tsp_2)$ is too loose when $Tsp_2$ lasts for a long time, i.e., when $L_2$ is large compared to the amount of time it takes for the air temperature to reach $Tsp_2$. This is shown by the substantial area 1006 between trajectory 1008 and straight line 1004. The error threshold is therefore adjusted by a factor that takes into account the minimum possible time ("$MinL_{Tsp}$") for the air temperature to reach the new setpoint temperature (i.e., to go from $Tsp_{i-1}$ to $Tsp_i$). The minimum possible time $MinL_{Tsp}$ is defined by the time a system takes under ideal conditions to reach go from $Tsp_{i-1}$ to $Tsp_i$. Recall that the time spent at $Tsp_i$ is denoted as $L_i$. For any $L_i$ that is less than $MinL_{Tsp}$, the error threshold is adjusted by the factor $MinL_{Tsp}/L_i$.

FIG. 10C shows a graph 1020 illustrating that, in some cases, $L_i$ that is greater than $MinL_{Tsp}$. In such cases, the setpoint temperature is changed again (e.g., from $Tsp_i$ to $Tsp_{i+2}$) before $Ta_i$ can possibly reach $Tsp_i$. For example, graph 1020 is shown to include air temperature line 1022 and temperature setpoint line 1024. As indicated by bars 1026, in two instances the temperature setpoint line 1024 changes faster than the air temperature line 1022 can reach the temperature setpoint line 1024. In such cases, the factor $MinL_{Tsp}/L_i$ is greater than one, which may cause the threshold to be too loose (i.e., to pass bad data as good data). Therefore, the error threshold definition caps $MinL_{Tsp}/L_i$ at one with the term $\min(MinL_{Tsp}/L_i, 1)$.

The error threshold definition also takes into consideration the effect of the deadband. Before doing a setpoint temperature change, the air temperature can be floating anywhere within the $Tsp_{i-1}$ deadband 902. Therefore, there is a possibility to be at the top or the bottom of the $Tsp_{i-1}$ deadband 902 before the change in setpoint temperature, which can influence the error by making Ta closer or farther from $Tsp_i$ at $S_i$. Therefore, the error threshold definition includes the term 2*DeadBand.

At step 812, the saturation detector 600 checks if $AvrgE_i$ is greater than $Threshold_i$. If not, at step 814, the saturation detector 600 determines that the time period from $k=S_i$ to $k=S_i+L_i$ does not contain significant saturation and leaves the data from that time period for inclusion in system identification at step 814.

Figure 11:
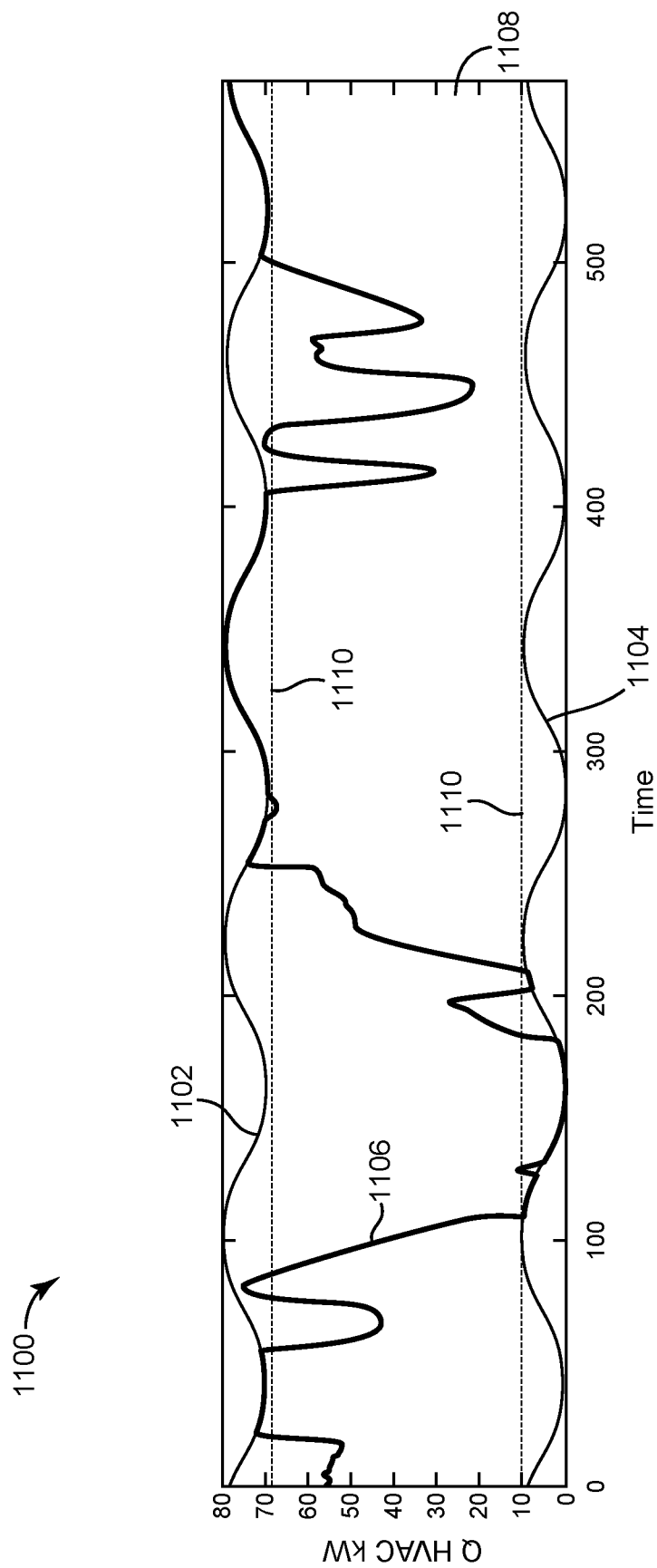
FIG. 11 is a graph of operating capacity measurements and operating capacity maximum and minimum values over time that illustrates concepts used in the process of FIG. 8, according to some embodiments.

If $AvrgE_i$ is greater than $Threshold_i$, at step 816 $Q_{max}$ and $Q_{min}$ values are calculated to define a transient region for $Q_{HVAC}$. FIG. 11 shows a graph 1100 of $Q_{HVAC}$ that can be helpful for explaining the transient region. The upper $Q_{HVAC}$ saturation limit 1102 and the lower $Q_{HVAC}$ saturation limit 1104 are not known a priori and can be time varying, as shown in FIG. 11. The $Q_{HVAC}$ line 1106 shows an example of a data series of $Q_{HVAC}$ data over time. Ideally, the region 1108 between the upper $Q_{HVAC}$ saturation limit 1102 and the lower $Q_{HVAC}$ saturation limit 1104 could be truncated along dashed lines 1110. However, because the values of dashed lines 1110 are also not know, the transient region is defined by truncating the region 1108 by a conservative percentage to avoid including any saturated $Q_{HVAC}$ data. This is done by taking the entire set of $Q_{HVAC}$ data (i.e., for all temperature setpoints, not just $Tsp_i$) and finding the minimum and maximum values of $Q_{HVAC}$. The region between the minimum and maximum values is then truncated by a total of thirty percent, for example. The percentage may be of a various magnitudes in various embodiments. The truncation may be done by defining $Q_{truncate}$ $0.15(\max(Q_{HVAC})-\min((Q_{HVAC}))$ and using that to define $=\max(Q_{HVAC})-Q_{truncate}$ and $Q_{min}=\min(Q_{HVAC})+Q_{truncate}$.

At step 818, logic vectors $Q_{transient}(k)$ are set to one if $Q_{HVAC}(k)$ is in the truncated region (i.e., in the transient region) and set to zero if $Q_{HVAC}(k)$ is not in the truncated region (i.e., in the non-transient region). That is, $Q_{transient}(k)=1$ if $Q_{min}<Q_{HVAC}(k)<Q_{max}$ is true and $Q_{transient}(k)=0$ if $Q_{min}<Q_{HVAC}(k)<Q_{max}$ is false.

At step 820, the saturation detector 600 checks if a threshold portion of $Q_{transient}(k)$ are 1. To do so, a fraction $Q_{Fraction,i}$ is defined as the sum of $Q_{transient}(k)$ for all k from $k=S_i$ to $k=S_i+L_i$ divided by $L_i$. The saturation detector 600 then checks if $Q_{Fraction,i}$ is greater than a threshold amount, for example one-half. In various embodiments, the threshold amount is a variety of fraction values (e.g., 0.1, 0.25, 0.5, 0.89). If $Q_{Fraction,i}$ is greater than the threshold amount (e.g., one-half), the saturation detector 600 determines that the time period from $k=S_i$ to $k=S_i+L_i$ does not contain significant saturation and leaves the data from that time period for inclusion in system identification at step 814.

If $Q_{Fraction,i}$ is not greater than one-half, the saturation detector identifies the time period $S_i$ to $S_i+L_i$ as containing saturated data and indicates the time period is to be removed from data used for system identification. Process 800 for each change in setpoint temperature in the data provided to the saturation detector 600, resulting in a list of one or more time periods to be removed from the data used for system identification. System identification can then proceed on the remaining data (i.e., data not identified for removal).

Configuration of Exemplary Embodiments

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A building management system, comprising:
building equipment configured to operate at an operating capacity to drive a variable state or condition of a building zone toward a setpoint, the operating capacity and the setpoint varying over time;
a sensor in the building zone configured to provide a zone measurement of the variable state or condition of the building zone;
a controller configured to:
determine whether an error for the building zone exists for a time period;
in response to a determination that the error for the building zone exists for the time period, determine whether the operating capacity is in a non-transient region for a threshold amount of the time period;
in response to a determination that the operating capacity is in the non-transient region for at least the threshold amount of the time period, indicate the time period as a saturation period; and
remove, modify, or exclude data for the saturation period from a set of system data before execution of a subsequent processing step.

2. The building management system of claim 1, wherein the saturation detector is configured to determine whether the error for the building zone exists for the time period by:
receiving data that includes the setpoint and the zone measurement for a plurality of time steps in the time period;
calculating an error term based on the zone measurements and the setpoints for the time period;
calculating an error threshold based on the setpoints for the time period and a preceding time period; and
determining whether the error term is greater than the error threshold.

3. The building management system of claim 2, wherein the saturation detector is configured to calculate the error term based on the setpoints and the zone measurements for the time period by:
determining, for the plurality of time steps in the time period, an error value based on a difference between the zone measurement for the time step and a deadband around the setpoint; and
dividing a sum of the error values for the time steps by a number of the plurality of time steps in the time period;
wherein the error value is set to zero if the zone measurement for the time step is within the deadband.

4. The building management system of claim 2, wherein the setpoint changes from a preceding setpoint to a selected setpoint at a beginning of the time period and from the selected setpoint to a subsequent setpoint at an end of the time period; and
wherein the saturation detector is configured to calculate the error threshold based on the setpoints for the time period and the preceding time period by:
calculating a difference between the preceding setpoint and the selected setpoint;
modifying the difference to account for deadbands around the setpoints; and
dividing the modified difference by a constant;
defining a fraction based on a duration of the time period and a minimum theoretical time needed for the building equipment to cause the zone measurement to go from the preceding setpoint to the selected setpoint; and
multiplying the modified difference by the fraction.

5. The building management system of claim 1, wherein the saturation detector is further configured to define the non-transient region as outside of a transient region, the transient region defined by:
receiving data that includes the operating capacity;
determining a region bound by a maximum measured operating capacity and a minimum measured operating capacity; and
truncating the region by a percentage of a difference between the maximum measured operating capacity and the minimum measured operating capacity.

6. The building management system of claim 1, wherein the saturation detector is configured to determine whether the operating capacity is in the non-transient region for the threshold amount of the time period by:
determining, for a plurality of time steps in the time period, whether the operating capacity for the time step is in the non-transient region;
counting a number of time steps for which the operating capacity is in the non-transient region; and
checking if the number is more than a threshold portion of a total number of time steps in the time period.

7. The building management system of claim 1, further comprising:

a training data generator configured to aggregate setpoints, zone measurements, and operating capacities over a sampling period and remove data corresponding to time periods indicated as saturation periods to generate a set of training data;
a system identification module that receives the set of training data and identifies a system model based on the training data; and
an equipment controller configured to generate an equipment control signal based on a current setpoint, a current zone measurement, and the system model, the equipment control signal configured to control the building equipment to drive the current zone measurement toward the current setpoint.

8. A method for managing building equipment, comprising:
operating building equipment at an operating capacity to drive a variable state or condition of a building zone toward a setpoint, the operating capacity and the varying over time;
measuring, by a sensor in the building zone, a zone measurement;
receiving, by a building management system, data that includes the operating capacity, the setpoint, and the zone measurement for a plurality of time steps in a time period;
determining whether an error for the building zone exists for the time period;
in response to a determination that the error for the building zone exists for the time period, determining whether the operating capacity is in a non-transient region for a threshold amount of the time period;
in response to a determination that the operating capacity is in the non-transient region for at least the threshold amount of the time period, indicating the time period as a saturation period; and
using the saturation period to modify a set of system data before execution of a subsequent processing step.

9. The method of claim 8, wherein determining that the error for the building zone exists comprises:
calculating an error term based on the zone measurements and the setpoints for the time period;
calculating an error threshold based on the setpoints for the time period and a preceding time period; and
determining whether the error term is greater than the error threshold.

10. The method of claim 9, wherein calculating an error term based on the zone measurements and the setpoints for the time period comprises:
determining, for the plurality of time steps in the time period, an error value based on a difference between the zone measurement for the time step and a deadband around the setpoint; and
dividing a sum of the error values for the time steps by a number of time steps in the time period;
wherein the error value is set to zero if the zone measurement for the time step is within the deadband, the zone measurement being an air temerpature measurement.

11. The method of claim 9, wherein the setpoint changes from a preceding setpoint to a selected setpoint at the beginning of the time period and from the selected setpoint temperature to a subsequent setpoint temperature at an end of the time period;
wherein calculating the error threshold based on the setpoints for the time period and a preceding time period comprises:

calculating a difference between the preceding setpoint and the selected setpoint;
modifying the difference to account for deadbands around the setpoint; and
dividing the modified difference by a constant; and
defining a fraction based on a duration of the time period and a minimum theoretical time needed for the building equipment to cause the zone measurement to go from the preceding setpoint to the selected setpoint; and
multiplying the modified difference by the fraction.

12. The method of claim 8, further comprising defining a non-transient region for operating capacities as outside of a transient region, the transient region defined by:
determining a region bound by a maximum measured operating capacity and a minimum measured operating capacity; and
truncating the region by a percentage of a difference between the maximum measured operating capacity and the minimum measured operating capacity.

13. The method of claim 8, wherein determining whether the operating capacity is in the non-transient region for the threshold amount of the time period comprises:
determining, for the plurality of time steps, whether the operating capacity for the time step is in the non-transient region;
counting a number of time steps for which the operating capacity is in the non-transient region; and
checking if the number is more than a threshold portion of a total number of time steps in the time period.

14. The method of claim 8, further comprising:
generating a set of training data by:
aggregating zone measurements, operating capacities, and setpoints over a sampling period that includes the time period;
removing zone measurements, operating capacities, and setpoints that correspond to the saturation period; and
identifying, based on the set of training data, a system model.

15. A method for saturation detection in an HVAC system, comprising:
operating HVAC equipment at a measurable operating capacity to heat or cool a building zone to approach a setpoint temperature;
measuring air temperature in the building zone;
changing the setpoint temperature a plurality of times over a time span;
for a plurality of time steps in the time span, aggregating data that includes an operating capacity, the setpoint temperature, and the air temperature;
defining a transient region of operating capacities corresponding to a non-saturated status and a non-transient region as outside of the transient region; and
for a time period of a plurality of time periods bound by sequential changes in setpoint temperatures:
calculating an error term for the time period based on the air temperatures and the setpoint temperature for the time period;
calculating an error threshold based on the setpoint temperature for the time period and a preceding setpoint temperature;
determining whether the error term is greater than the error threshold;
in response to a determination that the error term is greater than the error threshold, determining whether the operating capacity is in the non-transient region for a threshold amount of the time period; and
in response to a determination that the operating capacity is in the non-transient region for the threshold amount of the time period, indicating the time period as a saturation period; and
removing, modifying, or excluding data for the saturation period from a set of system data before execution of a subsequent processing step.

16. The method of claim 15, wherein defining a transient region of operating capacities corresponding to a non-saturated status comprises:
determining a maximum operating capacity in the time span;
determining a minimum operating capacity in the time span;
calculating a difference between the maximum operating capacity and the minimum operating capacity; and
defining the transient region as ranging between the maximum operating capacity reduced by a percentage of the difference and the minimum operating capacity increased by the percentage of the difference.

17. The method of claim 15, wherein calculating an error term for the time period based on the air temperatures and the setpoint temperature for the time period comprises:
determining, for a plurality of time steps in the time period, an error value based on a difference between the air temperature for the time step and a deadband around the setpoint temperature; and
dividing a sum of the error values for the time steps by a number of time steps in the time period;
wherein the error value is set to zero if the air temperature for the time step is within the deadband.

18. The method of claim 15, wherein calculating an error threshold based on the setpoint temperature for the time period and the preceding setpoint temperature comprises:
calculating a difference between the preceding setpoint temperature and the setpoint temperature;
modifying the difference to account for deadbands around the preceding setpoint temperature and the setpoint temperature; and
dividing the modified difference by a constant.

19. The method of claim 18, wherein calculating an error threshold based on the setpoint temperature for the time period and the preceding setpoint temperature comprises:
defining a fraction based on a duration of the time period and a minimum theoretical time needed for the HVAC equipment to cause the air temperature to go from the preceding setpoint temperature to a selected temperature setpoint; and
multiplying the modified difference by the fraction.

20. The method of claim 15, wherein determining whether the operating capacity is in the non-transient region for a threshold amount of the time period comprises:
determining, for a plurality of time steps in the time period, whether the operating capacity for the time step is in the non-transient region;
counting a number of time steps for which the operating capacity is in the non-transient region; and
checking if the number is more than a threshold portion of a total number of time steps in the time period.

* * * * *